United States Patent [19]
Tower

[11] Patent Number: 5,132,546
[45] Date of Patent: Jul. 21, 1992

[54] OBJECT DISTANCE MEASUREMENT WITH IMPROVED RESOLUTION THROUGH IMAGE CENTROID DETERMINATION

[75] Inventor: John R. Tower, Medford, N.J.

[73] Assignee: General Electric Company, Moorestown, N.J.

[21] Appl. No.: 636,514

[22] Filed: Dec. 31, 1990

[51] Int. Cl.$^5$ ............................................. G01N 21/86
[52] U.S. Cl. ........................................ 250/561; 356/1
[58] Field of Search ............... 250/561, 201.6, 201.7, 250/201.8; 356/1, 4, 141, 152

[56] References Cited

U.S. PATENT DOCUMENTS

4,916,302  4/1990  Sorimachi .......................... 356/1
4,923,303  5/1990  Lutz .................................. 250/561

Primary Examiner—David C. Nelms
Assistant Examiner—K. Shami
Attorney, Agent, or Firm—William H. Meise; Stephen A. Young; Clement A. Berard

[57] ABSTRACT

In a system for locating one object relative to another where one object is referenced to an active beacon and the other object is referenced to a solid state imaging device, circuitry determines the centroid of the image of the beacon as imposed on the imager. In accordance with the invention, the beacon is operated successively at two different wavelengths and two different centroids are determined. Based on a priori knowledge of imager responses at the two different wavelengths, the location capabilities of the system are improved relative to that when only one wavelength is utilized.

7 Claims, 6 Drawing Sheets

FIG. 7 (NEAR IR)

SAMPLE WINDOW (N=4)

|  | X1 | X2 | X3 | XN |
|---|---|---|---|---|
|  | 1 | 2 | 3 | 4 |
| Y1  1 |  |  |  |  |
| Y2  2 | 70 | 164 | 160 | 65 |
| Y3  3 | 70 | 164 | 160 | 65 |
| YN  4 |  |  |  |  |

INTENSITY AT EACH WINDOW PIXEL ( I(X,Y) )

FIG. 8 (BLUE)

SAMPLE WINDOW (N=4)

|  | X1 | X2 | X3 | XN |
|---|---|---|---|---|
|  | 1 | 2 | 3 | 4 |
| Y1  1 |  |  |  |  |
| Y2  2 | 43 | 88 | 74 | 25 |
| Y3  3 | 43 | 88 | 74 | 25 |
| YN  4 |  |  |  |  |

INTENSITY AT EACH WINDOW PIXEL ( I(X,Y) )

OBJECT DISTANCE MEASUREMENT WITH IMPROVED RESOLUTION THROUGH IMAGE CENTROID DETERMINATION

BACKGROUND OF THE INVENTION

1. Field of Invention

This invention is concerned with apparatus for determining the distance of one object relative to another and more particularly to such apparatus wherein one object functionally includes an active beacon and the other object functionally includes a solid state imaging device.

2. Description of the Prior Art

It is well known that distance measuring or ranging may be done employing a video camera resolving cooperative active beacons. In the most general case, triangulation and a priori knowledge of the beacon geometry permits azimuth, elevation and range to be calculated if the other three degrees of freedom (roll, pitch, yaw) are known and restricted.

The performance of the system is dependent upon the accuracy with which the centroid of each imaged light spot from each beacon may be determined. In the prior art, the beacons produced a single wavelength light which was received by a video camera with a solid state imager. Then a calculation of the centroid of the received image from each beacon was made and from known formulas, the location of the camera with regard to the beacon was determined. Since the beacon is mechanically connected to one object of interest and since the camera is connected to the other object of interest it is then possible to compute the distance or range of one object relative to the other. The range accuracy is a function of how accurately the centroids are determined.

SUMMARY OF THE INVENTION

In accordance with the present invention the distance determining apparatus comprises an active beacon capable of producing an output spot at two different wavelengths in series, a solid state imager arranged as a matrix of pixels for receiving the output of the beacon, the solid state imager exhibiting different response characteristics to the output of the beacon at the two different wavelengths, means causing the beacon to illuminate a two-dimensional array of imager pixels at one of the two wavelengths and for determining the centroid of the spot as received at the imager and thereafter causing the beacon to illuminate the same two-dimensional array of imager pixels at the other of the two wavelengths and for determining the centroid of the output spot as received at the imager, and means responsive to the two centroid values and to knowledge of the imager response characteristic of the imager for determining more accurately the distance of the beacon relative to the solid state imager than the distance indicated by either of the two centroid calculations alone.

DETAILED DESCRIPTION

Figure 1:
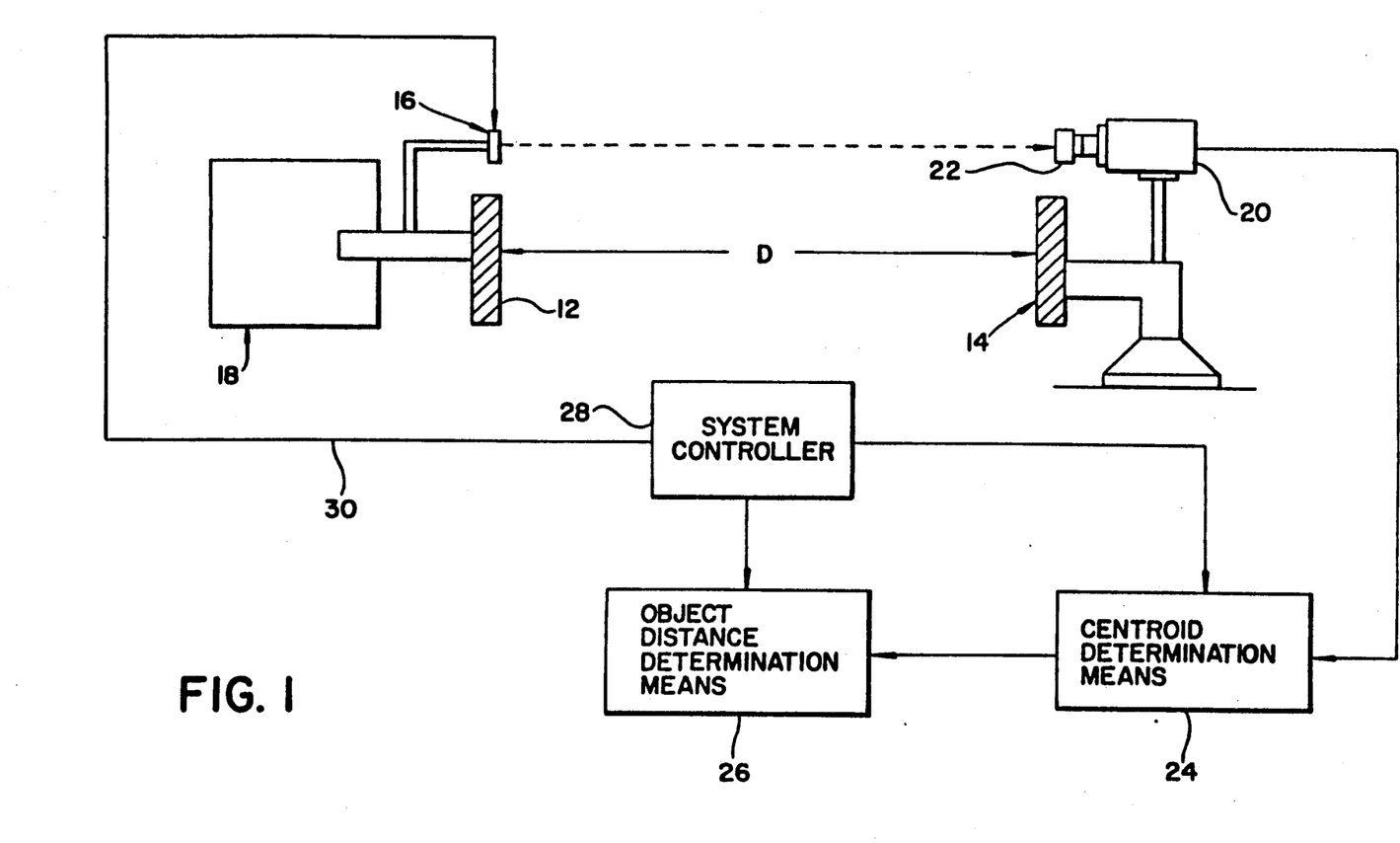
FIG. 1 is a system diagram of an object ranging system utilizing the present invention.
Figure 3A:
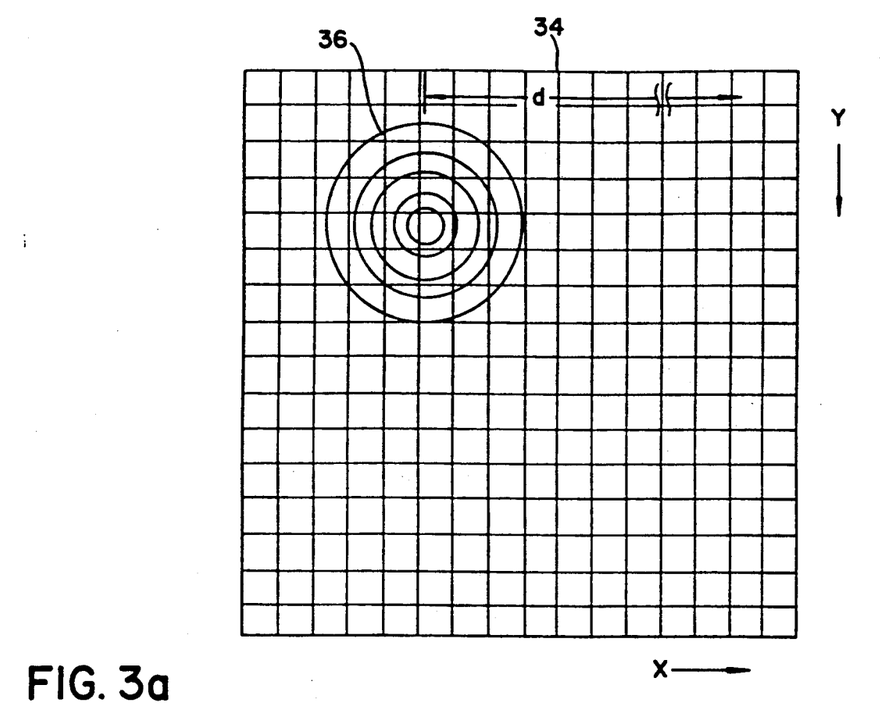
FIG. 3a illustrates a portion of the solid state imager of the camera illustrated in FIG. 1 with an image of a beacon superimposed thereupon.

Referring now to FIG. 1, the object is to determine the distance of a first object 12 relative to a second object 14 which, typically, is not mechanically coupled thereto. Toward that end, there is mechanically or functionally coupled to object 12 an active beacon arrangement 16 of which more will be said shortly. The object 12 may be coupled to a structure 18 capable of moving object 12 toward or away from object 14. Object 14 is mechanically or functionally coupled to an imaging device such as a solid state camera 20 with appropriate bandpass optics 22 and a solid state imager to be discussed hereinafter in connection with FIG. 3. The purpose of bandpass optics 22 is to bandpass limit the optical transmission to the two wavelengths of the beacons to be discussed hereinafter and to defocus the image which it receives from beacon arrangement 16. The output of camera 20 is coupled to the input of a centroid determination means 24.

The purpose of means 24 is to determine the centroid or center of various beacon images it receives from beacon arrangement 16 and this will be discussed in greater detail hereinafter. The output of centroid determination means 24 is coupled to object distance determination means 26 which uses the information received from means 24 to determine the distance between beacon arrangement 16 and camera 20 and thus the distance D between objects 12 and 14.

A system controller 28 provides necessary timing signals to centroid determination means 24 and to distance determination means 26. Furthermore, as will be discussed hereinafter, the beacons in active beacon arrangement 16 is operable at more than one wavelength and the control of those wavelengths is by means of the line 30 connecting the controller 28 to beacon arrangement 16.

It should be understood that the invention does not require that the active beacon arrangement 16 need be physically coupled to object 12 but there must be some mathematical relationship between where the two are so that the goal of determining distance between objects 12 and 14 may be accomplished. Similarly, it is not necessary that camera 20 be physically coupled to object 14 but rather, again, there must be some known mathematical relationship between where those two elements are in relation to one another.

Figure 2:
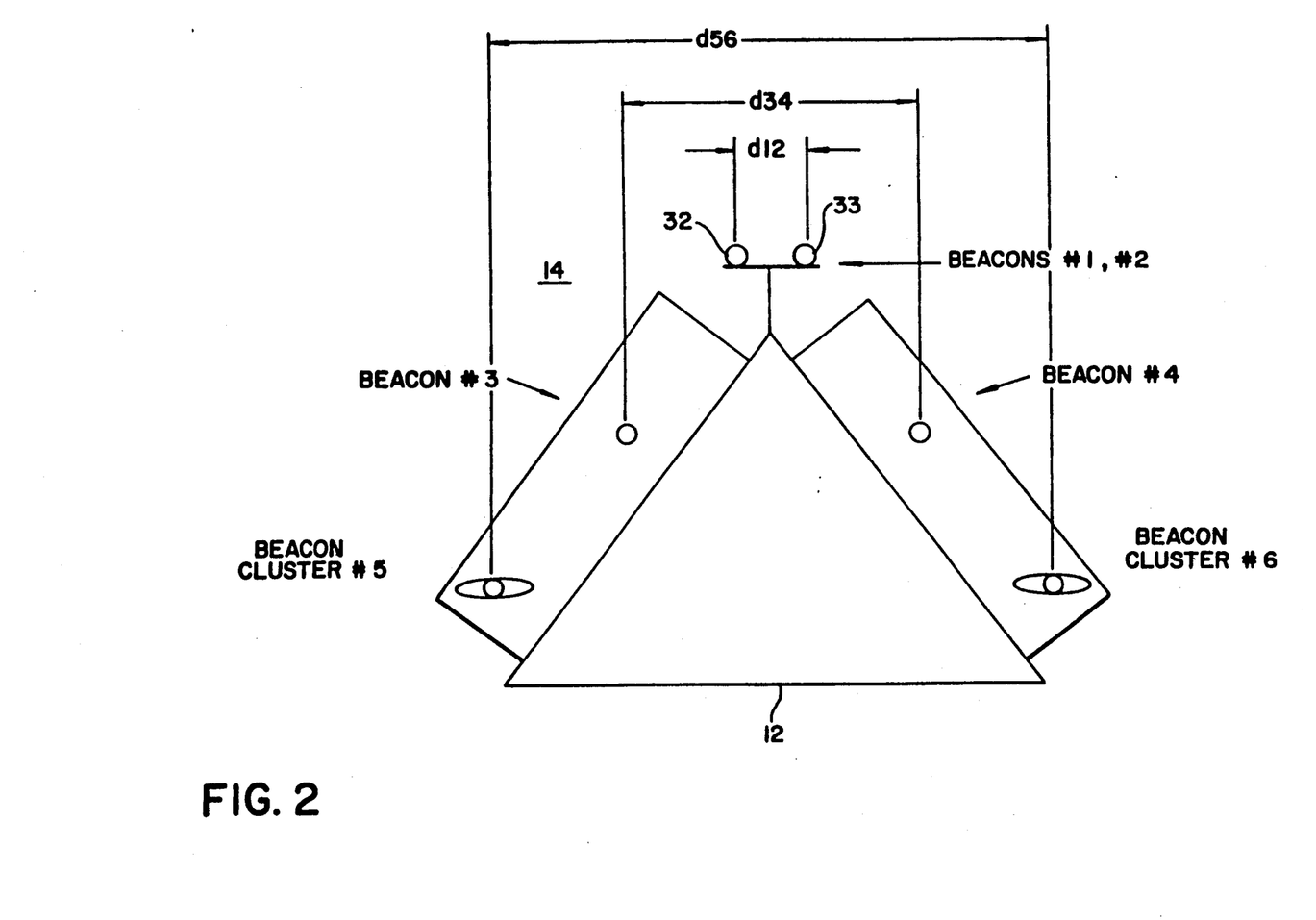
FIG. 2 is an exemplary beacon arrangement for use with the system of FIG. 1.

FIG. 2, to which attention is now directed, illustrates one exemplary beacon arrangement 16. The beacon arrangement, it will be noted, includes pairs of active beacons 1-2, 3-4 and a cluster of beacons 5-cluster of beacons 6. The beacon pairs are separated by distances d12, d34 and d56, respectively. Each beacon, such as beacon #1, also legended 32, typically comprises two light emitting diodes (LED), each capable of producing an output at a different one of two wavelengths. For example, one LED may produce a deep blue output at a wavelength of, for example, 450 nanometers and the other LED may produce a near-infrared output at a wavelength of, for example, 860 nanometers. The number of beacons and their arrangement are what mathematically enables distance measurement between objects 12 and 14 (FIG. 1). The particular pair of beacons used to determine distance between objects 12 and 14 is somewhat a function or distance D. At further distances higher numbered beacon pairs are used. The mathematics for determining the actual distance of one object relative to another, given inputs from two spaced apart beacons, is well known and forms no part of this invention. However, the idea of using two wavelengths of output from an active source is central to the invention and is what will be further described. For that purpose, we need only focus on the output of one beacon and its effect on camera 20 (FIG. 1).

Returning for a moment to FIG. 1, camera 20, as previously mentioned, includes optics 22 and a solid state imager within camera 20. The solid state imager, to be described in connection with FIG. 3a, consists of an array of rows and columns of individual imaging elements which are termed pixels. A typical solid state imager might have on the order of 480×640 pixels, that is, 480 rows of pixels, each row having 640 pixels arranged as columns. In accordance with the invention, optics 22 purposely defocuses light input from the various beacon pairs of beacon arrangement 16. Therefore, images from two beacons impinge on spaced apart points on the imager. Thus, each input such as, for example, the input of impinged light from beacon 32 in FIG. 2 is defocused so that it fits within an area of perhaps between 3-by-3 pixels (or even less than 1 pixel) to 10-by-10 pixels on the imager.

Turning now to FIG. 3a, there is illustrated a solid state imager 34 which for purposes of the present example, is 16-by-16, that is, it contains 16 rows each having 16 pixels. Another way of looking at solid state imager 34 is that it is arranged in columns along an X axis increasing from left to right in the figure and rows along the Y axis increasing from top to bottom in the figure. An image 36 from beacon 32 (FIG. 2) is illustrated as covering parts of six rows by six columns on imager 34. An image of a second beacon 33 of the pair, although not shown in FIG. 3a, is distance d away from the image that is shown.

Figure 3B:
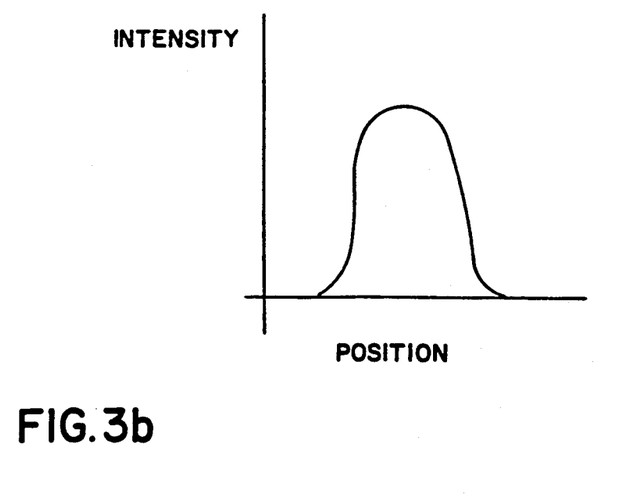
FIG. 3b is a waveform illustrating the intensity of an exemplary beacon spot.

The spot imaged on imager 34 is not of uniform intensity but rather has a more or less bell-shaped curve of intensity versus position, as illustrated in FIG. 3b. Thus, the intensity is greatest at the center of the spot and weaker as it approaches the edge of the spot until it, in fact, becomes 0 at about ±3 pixels from the center point. The various circles making up the image 36 in FIG. 3a are intended to represent points of arbitrary but uniform intensity.

Figure 4:
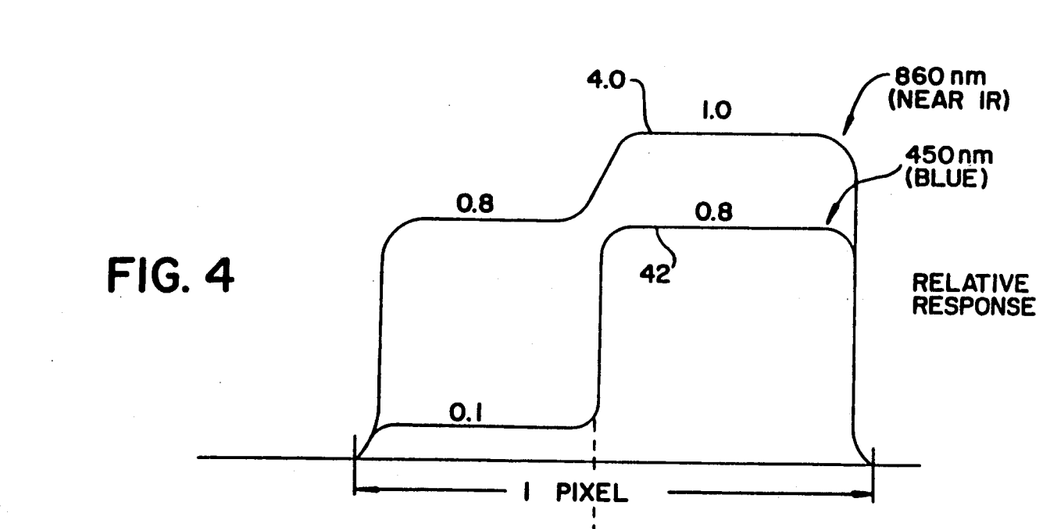
FIG. 4 is a waveform illustrating the response of a typical pixel in the solid state imager of FIG. 3a measured across one direction of the pixel.
Figure 5A:
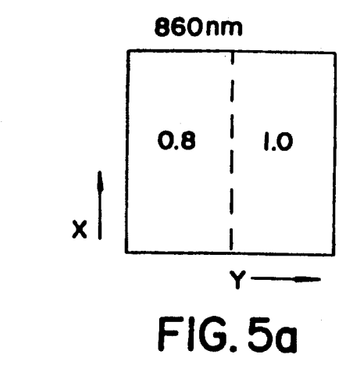
FIGS. 5a and 5b also show idealized responses of an imager pixel to two different frequencies of light.
Figure 5B:
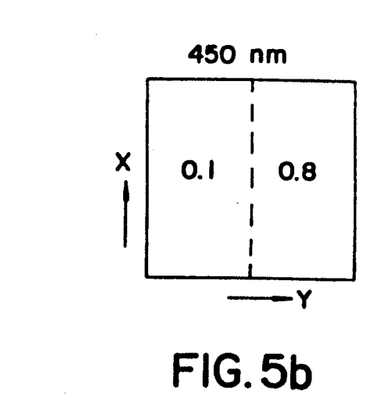

The output response of each pixel of imager 34 is not uniform across the pixel and is a function of the type of imager selected. In one such imager of the virtual phase type, the varying response is illustrated in FIG. 4 to which attention is now directed. FIG. 4 shows one single exemplary pixel from imager 34 (FIG. 3) and is illustrated with relative response on the vertical axis and the position along the pixel on the horizontal axis. Two exemplary responses are illustrated, one, 40, when impinged by light at near-infrared wavelength (860 nanometers) and one, 42, when impinged by light in the deep blue wavelength (450 nanometers). These two outputs can be determined empirically by simply moving a spot of light at a particular wavelength across the pixel, the spot being very small in diameter in comparison with the pixel size. It will thus be noted that for the near IR image, the output response is relatively greater than with a blue image and that the near IR response is more uniform than is the blue response. The response of the pixel in the direction normal to that illuminated in FIG. 4 is uniform for a virtual phase type imager. This is as illustrated in FIG. 5a at near IR and in FIG. 5b at blue.

Figure 6:
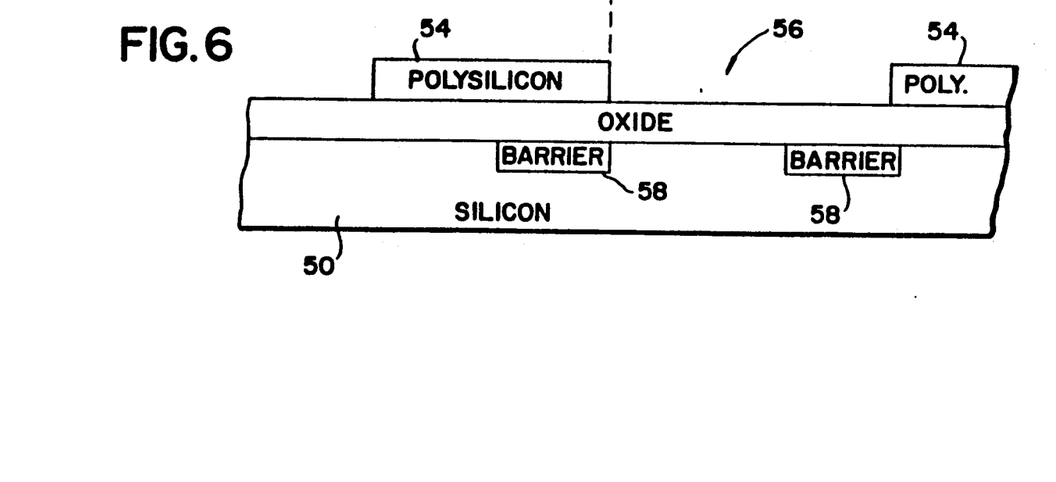
FIG. 6 is a cross-sectional view of an imager construction.

The reason for the wavelength dependent response will be understood by reference to FIG. 6 which shows in broken away cross-section the construction of one pixel and parts of two adjoining pixels of a virtual phase imager. In FIG. 6, which is not drawn to scale, a silicon substrate 50 has an oxide layer 52 overlaid thereon and a polysilicon layer 54 forming a window 56. Where the polysilicon is located the near IR response is attenuated only slightly (about 20%) while the blue responses is almost totally attenuated (about 90%). The barrier 58 embedded in the silicon 50 serves to provide directional control of charge storage and transfer.

The wavelength of the blue light should be chosen to match the wavelength producing the minimum signal response of the pixel. There will be such a minimum or null since the structure forms an interference stack.

It should be understood that there are a number of manufacturers of solid state imagers and that various imagers will produce various results such that the one shown in FIG. 4 is merely exemplary. Thus, for example, the Sanyo Cross Gate Imager has a waveform similar to FIG. 4 in both dimensions. The Texas Instruments Virtual Phase CCD, manufactured by Texas Instruments, having an address at Dallas, Tx. 75265 has a response like that of FIG. 4 in the vertical dimension and is uniform in response across the pixel width in the horizontal dimension as above described. Other imagers may, in fact, be customized to have various desired responses at various locations within the pixel at various wavelengths of light imaged thereon.

The first step in determining the relative location of two objects is determination of the centroid or central position of each beacon image of each beacon output (FIG. 2) imaged onto solid state imager 34. There are a number of algorithms known for determining centroid. Examples are gaussian interpolation, parabolic interpretation, and first moment.

Figure 7:
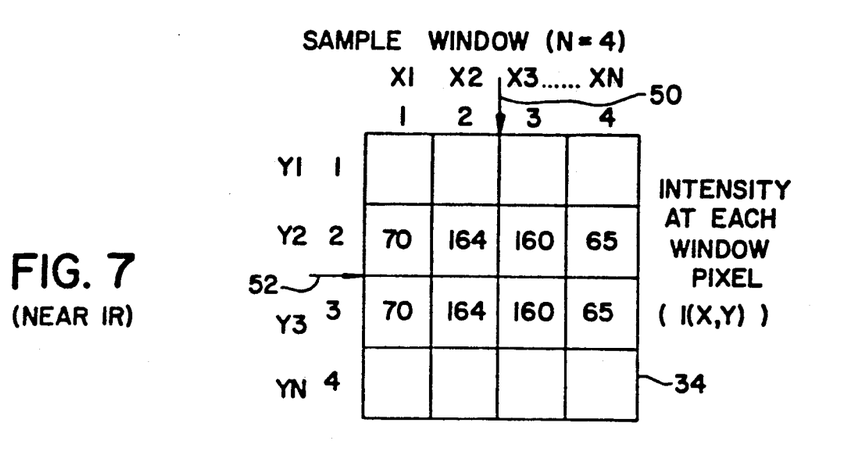
FIG. 7 illustrates a portion of the solid state imager of FIG. 3a with an impinged image illustrated as numeric values in the various pixels thereof from a beacon operating with the light at one wavelength.

To illustrate first moment, attention is directed to FIG. 7 which shows a sample window of pixels resulting from the imaging of one particular beacon at one particular wavelength, such as near IR, onto the solid state imager 34 of FIG. 3a illustrated in digital values. Here, however, each row and column is given a number and it is assumed for the sake of the calculation that the first row and first column are each 1 and the last row and last column are each 4. In reality, the rows and columns would likely be some greater and unequal values but that is not relevant to illustrating the principle. Actual impingement on imager 34 is presumed to be centered at X2.5, Y2.5 as indicated by arrows 50 and 52.

Figure 8:
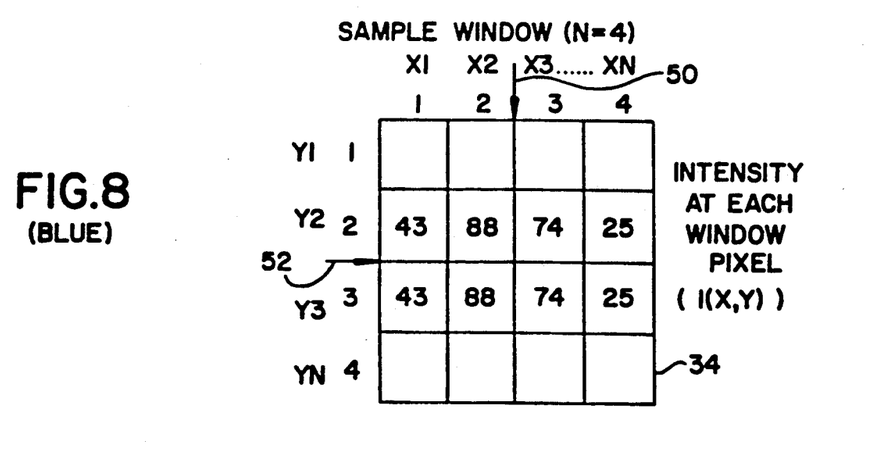
FIG. 8 illustrates a portion of the solid state imager of FIG. 3a with an impinged image illustrated as numeric values in the various pixels thereof from a beacon operating with the light at another wavelength.

Before describing how the centroid is computed, attention is directed to FIG. 8 which is identical to FIG. 7 except that the information there displayed is the result of a different wavelength light, such as deep blue, from a beacon impinged upon imager 34. Assuming FIG. 7 is related to a near-infrared beacon "color" and that FIG. 8 is related to a blue beacon output, the various numbers in the various pixel locations in FIG. 8 are generally lower in value than those in FIG. 7. This is consistent with the imager response waveforms shown in FIG. 4. However, the absolute numbers in the two FIGS. 7 and 8 are not of importance but what is of importance is the centroids computed for those two figures. Again, impingement of beacon 32 (FIG. 2) on imager 34 is assumed to be actually centered at X2.5, Y2.5 as indicated by arrows 50 and 52.

Figure 9A:
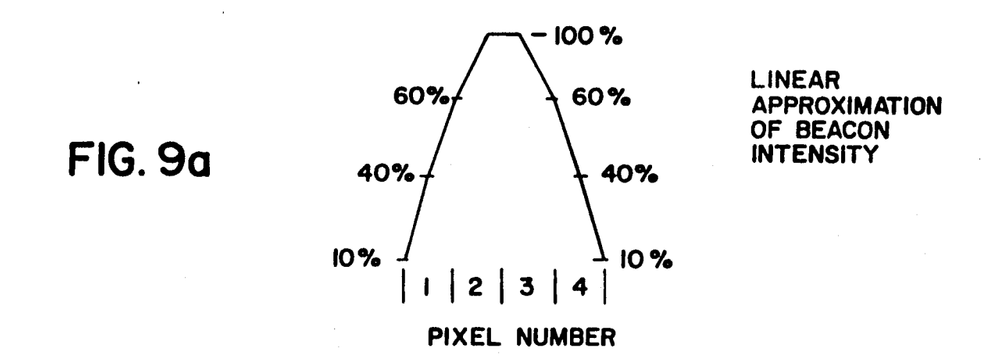
FIGS. 9a and 9b are an idealized illumination intensity from a exemplary active beacon of FIG. 2.
Figure 9B:
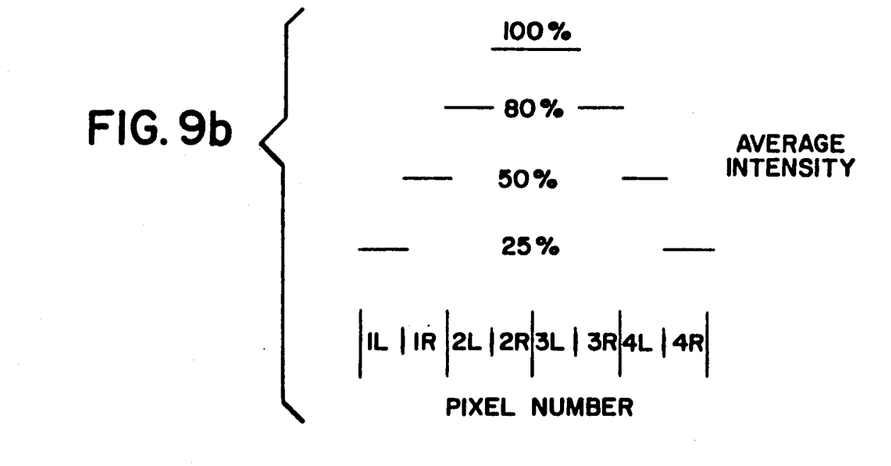

FIG. 9a illustrates a piecewise linear approximation of light intensity from an exemplary active beacon 32 (FIG. 2) as spread over four imager pixels and FIG. 9b, drawn to twice the scale of FIG. 9a on the horizontal axis, shows the average intensity at each half of four pixels. Thus, the average intensity of the left side of the pixel 1 (1L) is 25% of maximum while the average intensity of the right half (1R) is 50% of maximum.

As mentioned above, one method of computing a centroid is that known as the first moment, the formulas for which are illustrated below.

NORMALIZATION FACTOR $$W = \sum_{Y=Y1}^{Y=YN} \sum_{X=X1}^{X=XN} I(X,Y) \quad \text{(Formula 1)}$$

X COMPONENT OF CENTROID $$CX = \frac{1}{W} \sum_{X=X1}^{X=XN} X \sum_{Y=Y1}^{Y=YN} I(X,Y) \quad \text{(Formula 2)}$$

Y COMPONENT OF CENTROID $$CY = \frac{1}{W} \sum_{Y=Y1}^{Y=YN} Y \sum_{X=X1}^{X=XN} I(X,Y) \quad \text{(Formula 3)}$$

For a sample row, Y2 or Y3 with a near-infrared light spot centered at X2.5, Y2.5 as indicated by arrows 50 and 52, W at one row such as Y2 or Y3 is 70+164+160+65 and CX for that row is 2.479. The first and fourth rows can be similarly calculated.

In contrast, for a sample row, Y2 or Y3 with a deep blue light spot centered at X2.5, Y2.5, as indicated by arrows 50 and 52, W at one row such as Y2 or Y3 is 43+88+74+25 and CX for that row is 2.352. The first and fourth rows can be similarly calculated.

If the other light spot of the pair from beacon 12 is impinged on imager 34 to the left or right of the point of impingement shown in FIGS. 7 and 8, the CY calculations are not of importance. The centroid calculations are executed in means 24, FIG. 1, which may be logical hardware, a special purpose computer or a programmed general purpose computer, all well within the skills of the routiner in the art.

Once a centroid is calculated, a priori knowledge of imager construction and response to different wavelengths of light as illustrated in FIGS. 4 and 6 can be used to determine the true center of impingement of light on imager 34 and thus the distance D between objects 12 and 14 (FIG. 1) can be determined using known mathematical techniques in means 26, FIG. 1, which, as with means 24, may be logical hardware, a special purpose computer or a programmed general purpose computer, all well within the skills of the routiner in the art.

The steps in determining the improved center of impingement or centroid are as follows.

1. Compute center of mass of near-infrared (NIR) beacon (X and Y location of peak as above.)
2. Compute the size and intensity profile of the NIR beacon image by measuring intensities of pixels with intensities from the center of mass to 0.05 times the center of mass where the size of beacon image is the number of pixels in the X direction and number of pixels in the Y direction.
3. Using the NIR center of mass and intensity profile of the beacon image measured in Step 2, compute a gaussian intensity profile best fit to the measured intensity profile values and the center of mass.
4. Using the gaussian intensity profile best fit of NIR intensity profile (assuming the blue beacon image to have the same intensity profile as the NIR beacon image), convolve the gaussian intensity profile best fit with the known blue light aperture response of the imager (i.e. FIG. 5b arranged in a sample window such as illustrated in FIG. 7).
5. Compare the convolved response computed in Step 4 with the measured response of the imager 34 to the blue light in a least squares error computation.
6. Determine the point in the least squares error computation with the smallest error which point represents the improved accuracy beacon centroid.

With the improved centroid of the two beacons on imager 34 known, the distance d is known (FIG. 3a) and, since the distance between the two beacons (FIG. 2) being impinged on imager 34 is known, distance D (FIG. 1) can easily be calculated in means 26.

What is claimed is:

1. Distance determining apparatus comprising, in combination:

an active beacon capable of producing an output spot at first and second different wavelengths in series;

a solid state imager arranged as a matrix of pixels for receiving said output of said beacon, said solid state imager exhibiting different response characteristics to said output of said beacon at said two different wavelengths;

means causing said beacon to illuminate a two-dimensional array of said imager pixels at said first wavelength and for determining said centroid of said spot as received at said imager and thereafter causing said beacon to illuminate the same two-dimensional array of imager pixels at said second wavelength and for determining said centroid of said output of said spot as received at said imager; and means responsive to said two determined centroid values and to knowledge of said imager response characteristics of said imager for determining more accurately said distance of said beacon relative to said solid state imager than said distance indicated by either of said two centroid calculations alone.

2. The combination set forth in claim 1, wherein said active beacon comprises two light emitting diodes (LED) capable of producing said spot at one of said first and second different wavelengths, respectively.

3. The combination as set forth in claim 1 wherein said active beacon comprises means for producing two different spaced apart spots and wherein said means causing said beacon to illuminate a two-dimensional array of said imager pixels comprises means for determining the centroids of each of said spots as received at said imager at each of said first and second wavelengths and wherein said means responsive to said two determined centroid values is responsive to the two centroid values for each of said two imaged spots is responsive to knowledge of said imager response characteristics of said imager for determining more accurately said distance of said beacon relative to said solid state imager than said distance indicated by either of said two centroid calculations alone.

4. The combination set forth in claim 3, wherein said means for producing each of two spaced apart spots comprises two light emitting diodes (LED) capable of producing said spot at one of said first and second different wavelengths, respectively.

5. The combination set forth in claim 1 where said solid state imager is of the virtual phase type.

6. The combination set forth in claim 2 where said solid state imager is of the virtual phase type.

7. The combination set forth in claim 3 where said solid state imager is of the virtual phase type.

* * * * *